Figure 1:
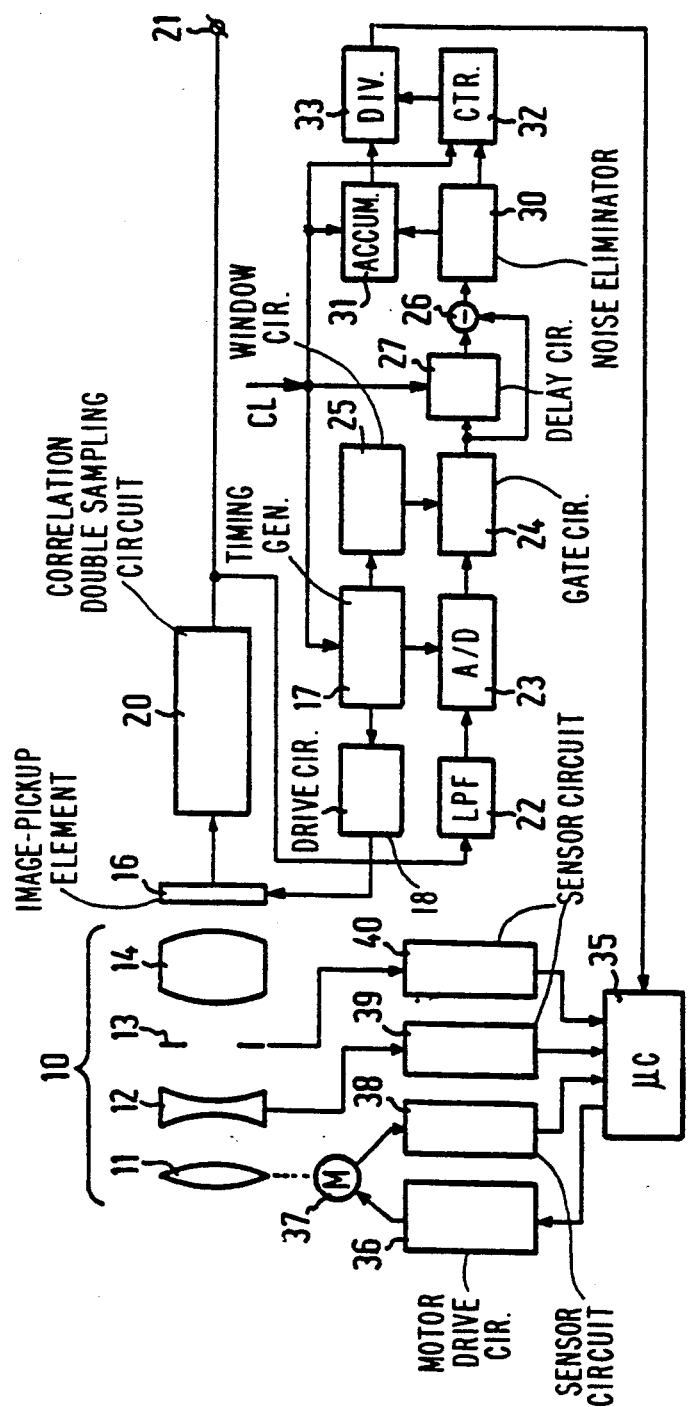

United States Patent
Miyazaki

[11] Patent Number: 5,182,649
[45] Date of Patent: Jan. 26, 1993

[54] AUTOMATIC FOCUS CONTROL DEVICE

[75] Inventor: Akihiko Miyazaki, Tokyo, Japan

[73] Assignee: U.S. Philips Corporation, New York, N.Y.

[21] Appl. No.: 696,442

[22] Filed: May 6, 1991

[30] Foreign Application Priority Data

May 11, 1990 [JP] Japan .................................. 2-122664

[51] Int. Cl.$^5$ ..................... H04N 5/232; G03B 3/00; G03B 13/18
[52] U.S. Cl. .................................. 358/227; 354/400; 354/402
[58] Field of Search ................ 358/227; 354/400, 402, 354/406, 408; 250/201.7, 201.4, 201.5, 201.8; 356/4

[56] References Cited

U.S. PATENT DOCUMENTS 4,717,959 1/1988 Isago ........................ 358/227
4,872,058 10/1989 Baba et al. ................ 358/227
5,012,270 4/1991 Sekine et al. ............. 354/430
5,083,150 1/1992 Nagasaki et al. .......... 354/402

Primary Examiner—Herbert Goldstein
Assistant Examiner—Joseph Colaianni
Attorney, Agent, or Firm—Edward W. Goodman

[57] ABSTRACT

An automatic focus control device capable of obtaining an accurate in-focus state of a subject having less high-frequency components is provided. A luminance signal of the video signal of the subject is first differentiated by a combination of a delay circuit (27) and a difference forming circuit (26). The differentiated luminance signals are accumulated by an accumulator (31), and a clock pulses CL are counted by a counter (32) during the periods when the differentiated luminance signals exceed a predetermined value. The accumulated value is then divided by the clock count at a divider (33) to obain a focus control signal which is fed to a microcomputer (35). The microcomputer causes a lens (11) to move in accordance with this focus control signal so that an optimum in-focus state of the subject is obtained.

3 Claims, 2 Drawing Sheets

AUTOMATIC FOCUS CONTROL DEVICE

The present invention relates to an automatic focus control device for use in a video camera, an electronic still camera or the like.

In the conventional automatic focus control device of this type, a focus control signal is formed, in general, based on the high-frequency components of a subject which are contained in a video signal thereof. The camera lens system is then moved in response to the focus control signal so that an in-focus state of the subject is attained. Conventionally, various circuit structures have been proposed for forming such a focus control signal. U.S. Pat. No. 4,717,959 discloses an automatic focusing device provided with a circuit in which differentiated values of a video signal are accumulated with values of the video signal itself being also accumulated. The accumulated values of the differentiated values are then divided by the accumulated values of the video signal to form a focus control signal. With such a circuit, however, it is difficult to obtain a focus control signal which has a large discrimination between an in-focus state and an out-of-focus state of a subject having less high-frequency components as a whole. One example of such a subject may be a subject with vertical stripes which have fewer points at which the luminance changes. Consequently, with the conventional automatic focus control device it has been difficult to obtain an accurate in-focus state of a subject which has less high-frequency components.

It is therefore an object of the present invention to provide an automatic focus control device in which an accurate in-focus state can be obtained even with respect to a subject which has less amount of high-frequency components.

According to the present invention, an automatic focus control device which comprises a camera lens, an image sensor element for converting optical information of a subject received through the camera lens into a video signal and control means for moving the camera lens in accordance with a focus control signal produced based on the video signal is characterized by comprising:

a differentiation circuit for differentiating the video signal to form differentiated values thereof;

an accumulator for successively accumulating the differentiated values;

a time-measuring circuit for measuring time periods during which the differentiated values exceed a predetermined value; and a divider for dividing an output of the accumulator by an output of the time-measuring circuit;

wherein the focus control signal is obtained from an output of the divider.

With the above structure, it is possible to obtain a focus control signal which provides a large discrimination between an in-focus state and an out-of-focus state of a subject having less amount of high-frequency components, such as a subject having a white background with vertical black stripes or black dots and a subject having a black background with vertical white stripes or white dots.

In an automatic focus control device according to the present invention, the accumulator may be constructed such that the differentiated values are successively accumulated in response to a clock signal of a predetermined time interval. In this case, the time-measuring circuit may be constructed with a counter which counts the clock signal during the time when the differentiated values exceed the predetermined value.

The differentiation circuit may further be constructed comprising a delay circuit for delaying the video signal by a predetermined time interval and a difference forming circuit for forming a difference between the video signal and an output of the delay circuit, so that the differentiated values are obtained at an output terminal of the difference forming circuit.

Figure 2:
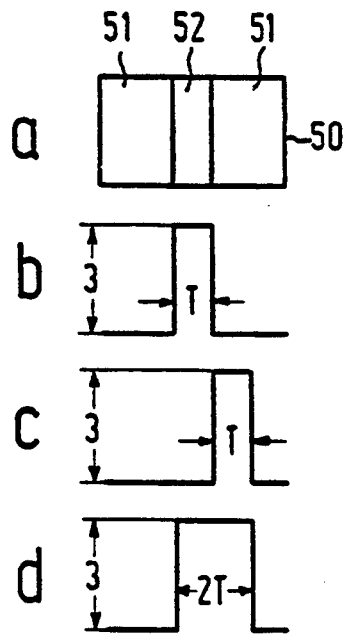
Figure 4:
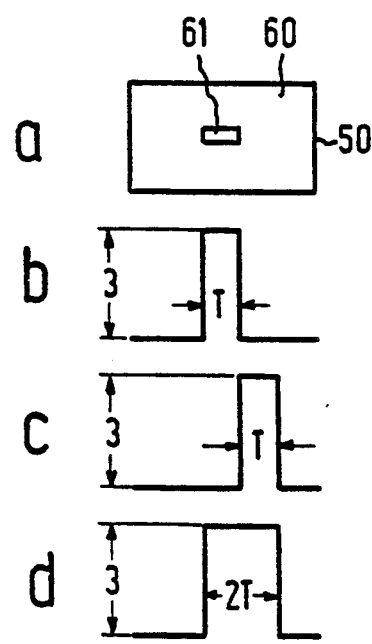
Figure 3:
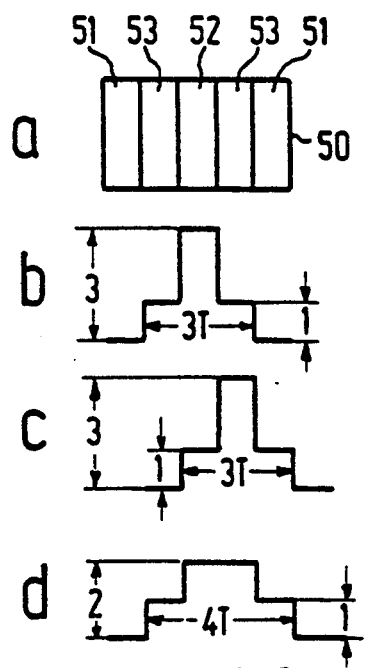
Figure 5:
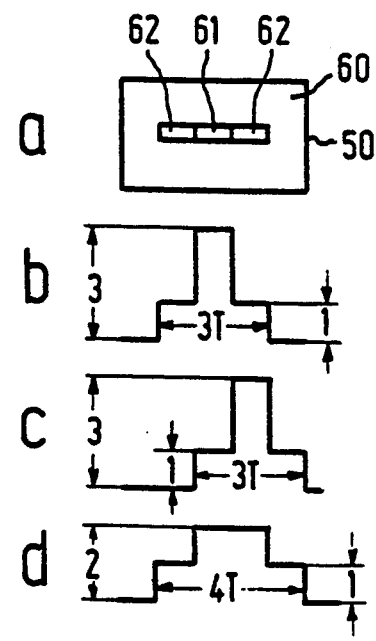

One embodiment of the present invention will now be described by way of example with reference to the accompanying drawings, in which:

FIG. 1 is a block diagram of an automatic focus control device according to the invention which has been applied to a video camera;

FIGS. 2 and 3 are illustrations for explaining the operation of the embodiment of FIG. 1 with regard to an in-focus state and an out-of-focus state, respectively, of a subject having a black background with a vertical white stripe; and FIGS. 4 and 5 are illustrations for explaining the operation of the embodiment of FIG. 1 with regard to an in-focus state and an out-of-focus state, respectively, of a subject having a black background with a white dot.

In FIG. 1, shown at 10 is a camera lens system of a video camera to which an automatic focus control device according to the invention is applied. This lens system comprises a front lens group 11, a zoom lens group 12, an iris device 13 and a master lens group 14.

Optical information of a subject passed through the camera lens system 10 reaches an image-pickup element 16. This image-pickup element is comprised, for example, of a charge coupled device (CCD) and is driven by a drive circuit 18 synchronized with an output from a timing generator 17 to convert the optical information into an electric signal complying with a predetermined scanning system. The signal from the image-pickup element 16 is supplied through a correlation double sampling circuit 20 to an output terminal 21 and a low-pass filter 22 as a video signal. The video signal at the output terminal 21 is supplied to other video signal processing sections (not shown) inside and/or outside this video camera.

The video signal supplied to the low-pass filter 22 is subjected therein to a filtering for removing its unnecessary frequency components to cause it to represent a luminance signal and is then supplied to an analog-to-digital (A/D) converter 23. This A/D converter converts the supplied video signal into digital values at a predetermined sampling interval and supplies these values to a gate circuit 24. This gate circuit is controlled by a window circuit 25, which has a known structure and is synchronized with another output of the timing generator 17, to output only those portions of the digital video signal which correspond to a selected scanning area (i.e., a window defining the focus control area). The video signal passed through the gate circuit 24 is supplied to one input terminal of a difference forming circuit 26 and to an input terminal of a delay circuit 27 for effecting a signal delay of one clock on a clock signal CL which has a predetermined period and is supplied from the timing generator 17. The difference forming circuit 26 forms a difference between the output of the gate circuit 24 and that of the delay circuit 27 and outputs the difference in an absolute value. This output of the difference forming circuit 26 is supplied to a noise eliminator 30.

The noise eliminator 30 supplies the output data of the difference forming circuit 26 to an accumulator 31 as it is and to a counter 32 as an enabling signal when the data is greater than a predetermined value. The accumulator 31 accumulates the supplied data, for example, for each picture field in response to respective pulses of the aforesaid clock signal CL and supplies the accumulated data to one input terminal of a divider 33. The counter 32 counts the pulses of the clock signal CL when the enabling signal is supplied, which counting operation is performed, for example, for each field. The divider 33 divides the resultant accumulated data fed from the accumulator 31 by the count result fed from the counter 32 and outputs the quotient to a microcomputer 35 as evaluation data for the focus control, i.e., as a focus control signal.

The microcomputer 35 is of the conventional structure and carries out the focus control based on the above focus control signal in a manner as described, for example, in U.S. Pat. No. 4,717,959. More specifically, the microcomputer 35 is so arranged as to drive through a motor drive circuit 36 a motor 37 coupled to the front lens group 11 to thereby move the same back and forth along an optical axis thereof. The microcomputer 35 is also arranged to receive information representative of the axial position of the front legs group 11 through a sensor circuit 38. The microcomputer 35 further receives information representative of the position of the zoom lens group 12 and of the degree of opening of the iris device 13 through the sensor circuits 39 and 40, respectively. The microcomputer 35 carries out the focus control by driving the motor 37 based on the focus control signal fed from the divider 33 and with reference to other signals, for example, from the above-described sensor circuits so that the front lens group 11 is moved to such a position at which the focus control signal takes the maximum value.

The operation of this embodiment having the above-described structure will now be described with reference to FIGS. 2 to 5.

For simplicity, description will hereinafter be made only as to each case where the picture of a subject within the focus control window has a black background with a vertical white strip or a black background with a white dot. In this case, it is assumed that the width of the vertical white stripe in the horizontal direction and the diameter of the white dot are each of the order of one clock period T of the clock signal CL. It should be noted that the vertical white stripe and the white dot are illustrated in an exaggerated manner in these figures.

FIG. 2-(a) shows the picture in the in-focus condition within the focus control window, which picture is of the subject having a black background 51, 51 with a vertical white stripe 52. As described earlier, the width of the vertical stripe 52 corresponds only to one clock period T but is illustrated exaggeratedly. FIG. 2-(b) shows the output signal of the gate circuit 24 in the above case, wherein the signal has a "0" level corresponding to the black background 51, 51 and another level, for example, of "3" for one clock period T corresponding to the vertical white stripe. FIG. 2-(c) shows the output of the delay circuit 27. As a result, the output of the difference forming circuit 26 has such a waveform as illustrated in FIG. 2-(d), which waveform indicates that the accumulated values of $a_k$ ($k=1, 2, 3, \ldots$)

to be obtained at the accumulator 31 for each horizontal line will be $3+3=6$. Therefore, if the focus control window 50 contains m horizontal lines, the accumulated values obtained at the accumulator 31 in one picture field will be:

$$\sum_{k=1}^{m} a_k = 6m$$

On the other hand, the count result at the counter 32 is 2 m. The value of the focus control signal obtained at the divider 33 in each field is thus:

$6m/2m = 3$

FIG. 3-(a) shows the picture within the focus control window 50 which has been obtained by shooting the same subject as in FIG. 2 in an out-of-focus condition, wherein a gray area 53 appears between the black background 51, 51 and the vertical white stripe 52 due to the out-of-focusing. FIG. 3-(b) shows the output signal of the gate circuit 24 similarly to the showing of FIG. 2-(b), which signal now has in addition to a "0" level corresponding to the black background 51, 51 and a level of "3" corresponding to the vertical white stripe 52 another level, for example, of "1" corresponding to the gray area 53, 53. FIGS. 3-(c) and 3-(d) show the outputs of the delay circuit 27 and the difference forming circuit 26, respectively. The value of the focus control signal produced at the divider 33 in each picture field in this out-of-focus condition can be obtained in the same manner as in the case of FIG. 2:

$$\sum_{k=1}^{m} a_k/4m = 6m/4m = 1.5$$

It will be appreciated that the focus control signal fed from the divider 33 thus provides a sufficient discrimination, such as 3 to 1.5, between the in-focus condition and the out-of-focus condition even for such a subject having less high-frequency components as that shown in FIGS. 2 and 3.

FIG. 4-(a) shows the picture within the focus control window 50 which has been obtained by shooting another subject having a black background 60 with a white dot 61 in a in-focus condition. In that case, it is assumed that the white dot 61 is located on the nth horizontal line and has a diameter of the order of one clock period T, when measured in the horizontal direction, and of the same order of the width of a horizontal line when measured in the vertical direction. FIG. 4-(b) shows the output signal of the gate circuit 24 corresponding to nth horizontal line, which signal has a "0" level corresponding to the black background 60 and another level, for example, of "3" corresponding to the white dot 61. FIGS. 4-(c) and 4-(d) show the outputs of the delay circuit 27 and the difference forming circuit 26, respectively. Therefore, the value of the focus control signal obtained at the divider 33 in each field is:

$a_n/2 = 6/2 = 3$

FIG. 5-(a) shows the picture within the focus control window 50 which has been obtained by shooting the same subject as in FIG. 4 in an out-of-focus condition, wherein gray areas 62 and 62 appear on both sides of the white dot 61 due to the out-of-focusing. FIG. 5-(b)

shows the output signal of the gate circuit 24, which signal now has in addition to a "0" level corresponding to the black background 60, 60 and a level of "3" corresponding to the white dot 61 another level, for example, of "1" corresponding to the gray area 62, 62. FIGS. 5-(c) and 5-(d) show the outputs of the delay circuit 27 and the difference forming circuit 26, respectively. Therefore, the value of the focus control signal produced at the divider 33 in each picture field in this out-of-focus condition is:

$$a_n/4 = 6/4 = 1.5$$

It will be appreciated from the above that the focus control signal fed from the divider 33 provides a sufficient discrimination, such as 3 to 1.5, between the in-focus condition and the out-of-focus condition even for such a subject which has less high-frequency components as that shown in FIGS. 4 and 5.

I claim:

1. An automatic focus control device which comprises a camera lens, an image sensor element for converting optical information of a subject received through the camera lens into a video signal and control means for moving the camera lens in accordance with a focus control signal produced based on the video signal, wherein said automatic focus control device comprises a differentiation circuit for differentiating the video signal to form differentiating values thereof; an accumulator for successively accumulating said differentiated values and producing output signals indicative of said differentiated values; a time measuring circuit for measuring time periods during which said differentiated values exceed a predetermined value and for producing output signals representative of said time periods; and a divider for dividing output signals of said accumulator by output signals of said time measuring circuit and producing output signals indicative of divisions of said signals; and wherein the focus control signal is obtained from output signals of said divider.

2. An automatic focus control device according to claim 1, wherein said accumulator is so constructed as to successively accumulate the differentiated values in response to clock signals of a predetermined time interval, said time measuring circuit comprising a counter which counts the clock signals during the time periods when the differentiated value exceeds said predetermined value and which produces output signals indicative of said counts, said divider dividing output signals of said accumulator by output signals of said counter.

3. An automatic focus control device according to claim 1 or claim 5, wherein said differentiation circuit comprises a delay circuit for producing output signals representative of video signals delayed by a predetermined period and a difference forming circuit for forming a difference between video signals and output signals of said delay circuit, whereby the differentiated values are obtained at an output terminal of said difference forming circuit.

* * * * *